US012452603B2

(12) United States Patent
Zhang et al.

(10) Patent No.: US 12,452,603 B2
(45) Date of Patent: Oct. 21, 2025

(54) DOUBLE-SIDED SOUNDING DEVICE

(71) Applicant: AAC Microtech (Changzhou) Co., Ltd., Jiangsu (CN)

(72) Inventors: Long Zhang, Changzhou (CN); Yu Qi, Changzhou (CN); Xiwen Du, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 202 days.

(21) Appl. No.: 18/533,105

(22) Filed: Dec. 7, 2023

(65) Prior Publication Data

US 2024/0348980 A1 Oct. 17, 2024

Related U.S. Application Data

(63) Continuation of application No. PCT/CN2023/087547, filed on Apr. 11, 2023.

(51) Int. Cl.
*H04R 9/02* (2006.01)
*H04R 7/12* (2006.01)
*H04R 9/06* (2006.01)

(52) U.S. Cl.
CPC ............... *H04R 9/025* (2013.01); *H04R 7/12* (2013.01); *H04R 9/06* (2013.01); *H04R 2209/022* (2013.01)

(58) Field of Classification Search
CPC . H04R 9/025; H04R 7/12; H04R 9/06; H04R 2209/022; H04R 9/063; H04R 2499/11
See application file for complete search history.

(56) References Cited

FOREIGN PATENT DOCUMENTS

CN 218772413 U * 3/2023 ............... H04R 9/02

* cited by examiner

*Primary Examiner* — Tuan D Nguyen
(74) *Attorney, Agent, or Firm* — Wiersch Law Group

(57) ABSTRACT

A double-sided sounding device is disclosed. The double-sided sounding device includes an upper vibration system and a lower vibration system. The upper vibration system includes an upper voice coil, and the lower vibration system includes a lower voice coil. The upper voice coil includes a first voice coil and a second voice coil respectively arranged on two opposite sides of the lower voice coil along a direction of a long axis of the double-sided sounding device. The double-sided sounding device reduces the product width, has symmetrical electromagnetic force performances of the upper voice coil and the lower voice coil, and eliminates mutual interferences between the upper voice coil and the lower voice coil when working.

8 Claims, 3 Drawing Sheets

A-A

A-A

B-B

DOUBLE-SIDED SOUNDING DEVICE

FIELD OF THE PRESENT DISCLOSURE

The present disclosure relates to electroacoustic transducers, in particular to a double-sided sounding device.

DESCRIPTION OF THE RELATED ART

A double-sided sounding device in the related art includes an upper frame, a lower frame arranged on a lower side of the upper frame, an upper vibration system fixed to an upper side of the upper frame, a lower vibration system fixed to a lower side of the lower frame, and a magnetic circuit system arranged between the upper vibration system and the lower vibration system. The upper vibration system includes an upper diaphragm and an upper voice coil driving the upper diaphragm for vibrating and sounding, and the lower vibration system includes a lower diaphragm and a lower voice coil driving the lower diaphragm for vibrating and sounding. The upper voice coil surrounds the lower voice coil.

However, since the upper voice coil surrounds the lower voice coil, on one hand, it makes the width of the double-sided sounding device excessive, on the other hand, it causes asymmetric electromagnetic force performances of the upper voice coil and the lower voice coil. In addition, the upper voice coil and the lower voice coil interfere with each other when working, resulting in poor acoustic performances.

Thus, it is necessary to provide a novel double-sided sounding device to solve the problems.

SUMMARY

An objective of the present disclosure is to overcome the above technical problems and provide a double-sided sounding device which reduces the product width, has symmetrical electromagnetic force performances of the upper voice coil and the lower voice coil, and eliminates mutual interferences between the upper voice coil and the lower voice coil when working.

In order to achieve the objective mentioned above, the present disclosure discloses a double-sided sounding device including an upper frame, a lower frame arranged on a lower side of the upper frame, an upper vibration system fixed to an upper side of the upper frame, a lower vibration system fixed to a lower side of the lower frame, and a magnetic circuit system arranged between the upper vibration system and the lower vibration system. The upper vibration system includes an upper diaphragm and an upper voice coil driving the upper diaphragm for vibrating and sounding, and the lower vibration system includes a lower diaphragm and a lower voice coil driving the lower diaphragm for vibrating and sounding. The upper voice coil includes a first voice coil and a second voice coil respectively arranged on two opposite sides of the lower voice coil along a direction of a long axis of the double-sided sounding device.

As an improvement, the magnetic circuit system includes an upper plate fixed to the upper frame, a lower plate fixed to the lower frame, a first main magnet fixed to a surface of the upper plate facing the lower plate, a first yoke fixed to the first main magnet, a second main magnet and a third main magnet fixed to a surface of the lower plate facing the upper plate and respectively arranged on two opposite sides of the first main magnet along the direction of the long axis of the double-sided sounding device, a second yoke fixed to the second main magnet, a third yoke fixed to the third main magnet, and a first side magnet and a second side magnet respectively arranged on two opposite sides of the first main magnet, the second main magnet and the third main magnet along a direction of a short axis of the double-sided sounding device and sandwiched between the upper plate and the lower plate. The upper voice coil and the lower voice coil are arranged between the first side magnet and the second side magnet. The lower voice coil surrounds the first main magnet and the first yoke. The first voice coil surrounds the second main magnet and the second yoke. The second voice coil surrounds the third main magnet and the third yoke.

As an improvement, the lower plate includes a first side wall and a second side wall respectively arranged on two opposite sides of the second main magnet along the direction of the long axis of the double-sided sounding device, and a third side wall and a fourth side wall respectively arranged on two opposite sides of the third main magnet along the direction of the long axis of the double-sided sounding device. The second side wall is arranged adjacent to the third side wall. The second side wall is arranged between the lower voice coil and the first voice coil. The third side wall is arranged between the lower voice coil and the second voice coil.

As an improvement, the second side wall and the third side wall abut against the surface of the upper plate facing the lower plate.

As an improvement, a surface of the first yoke facing the lower diaphragm is flush with a surface of the lower plate facing the lower diaphragm.

As an improvement, surfaces of the second yoke and the third yoke facing the upper diaphragm are flush with a surface of the upper plate facing the upper diaphragm.

As an improvement, the upper vibration system further includes an upper flexible circuit board sandwiched between the upper diaphragm and the upper voice coil, and the lower vibration system further includes a lower flexible circuit board sandwiched between the lower diaphragm and the lower voice coil.

As an improvement, the upper diaphragm and the lower diaphragm have the same shape and size.

In the double-sided sounding device according to the present disclosure, the upper vibration system includes the upper voice coil, and the lower vibration system includes the lower voice coil, wherein the upper voice coil includes a first voice coil and a second voice coil respectively arranged on two opposite sides of the lower voice coil along the direction of the long axis of the double-sided sounding device. The upper voice coil and the lower voice coil are arranged side by side in the direction of the long axis of the double-sided sounding device, thereby reducing the product width and eliminating mutual interferences between the upper voice coil and the lower voice coil when working. In addition, the upper voice coil and the lower voice coil have symmetrical electromagnetic force performances by adjusting the length ratios of the first voice coil, the lower voice coil and the second voice coil.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
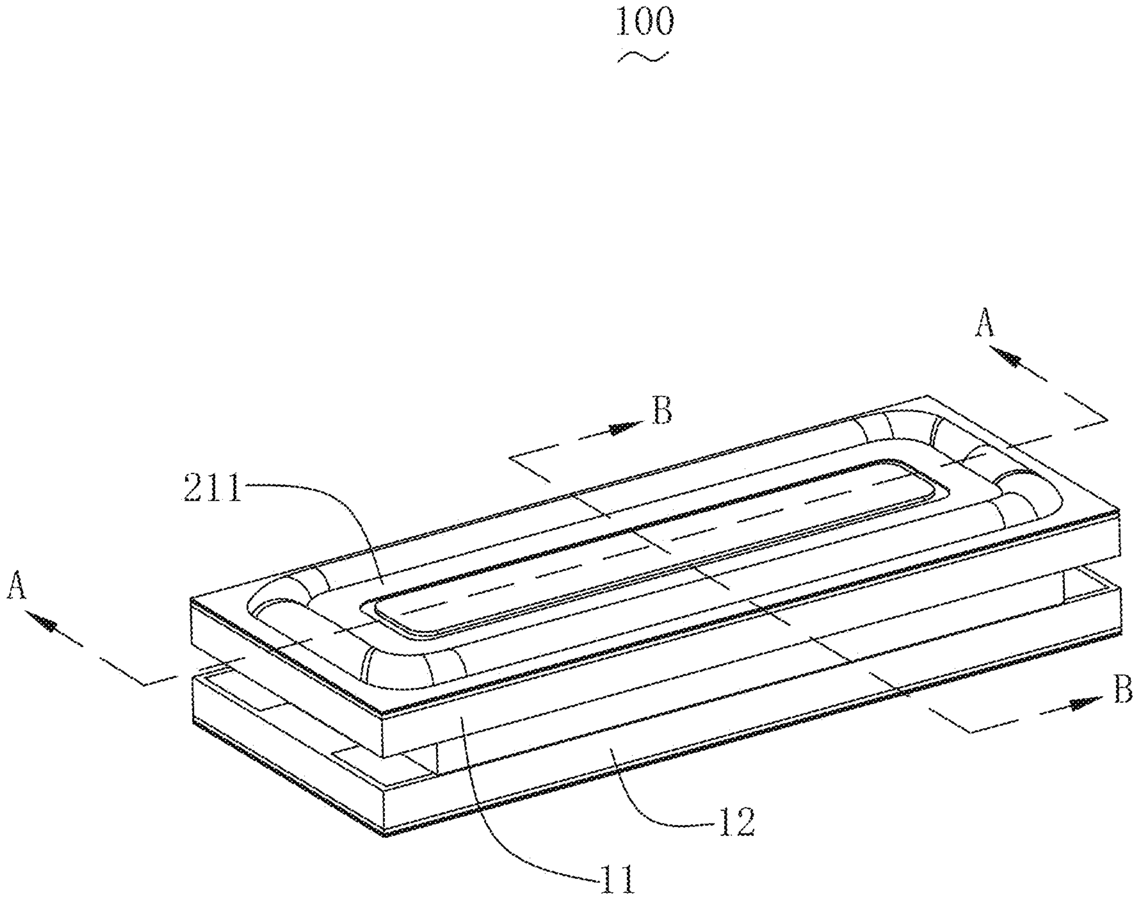
FIG. 1 is an isometric view of a double-sided sounding device in accordance with an exemplary embodiment of the present disclosure.
Figure 2:
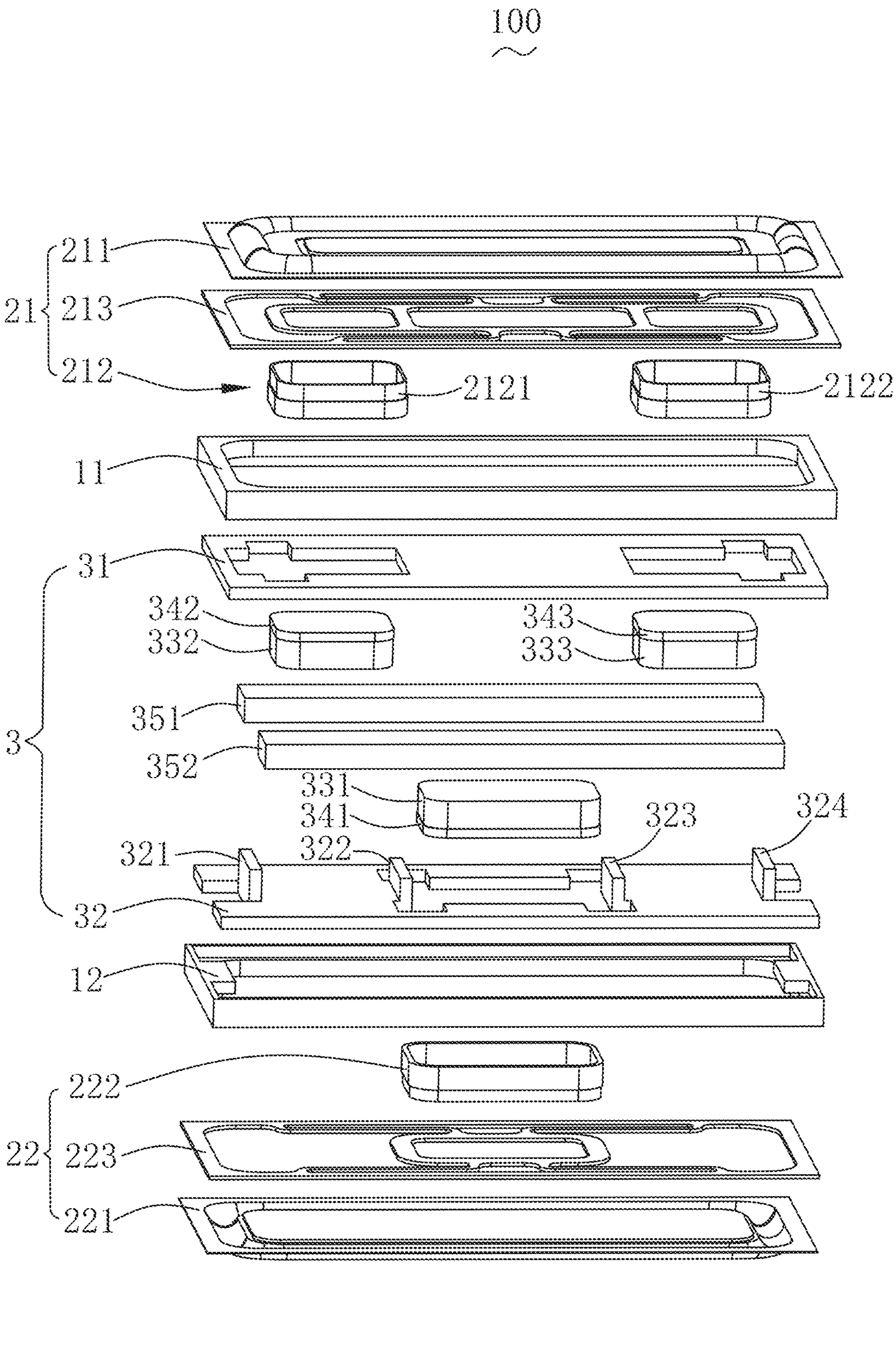
FIG. 2 is an exploded view of the double-sided sounding device in FIG. 1.
Figure 3:
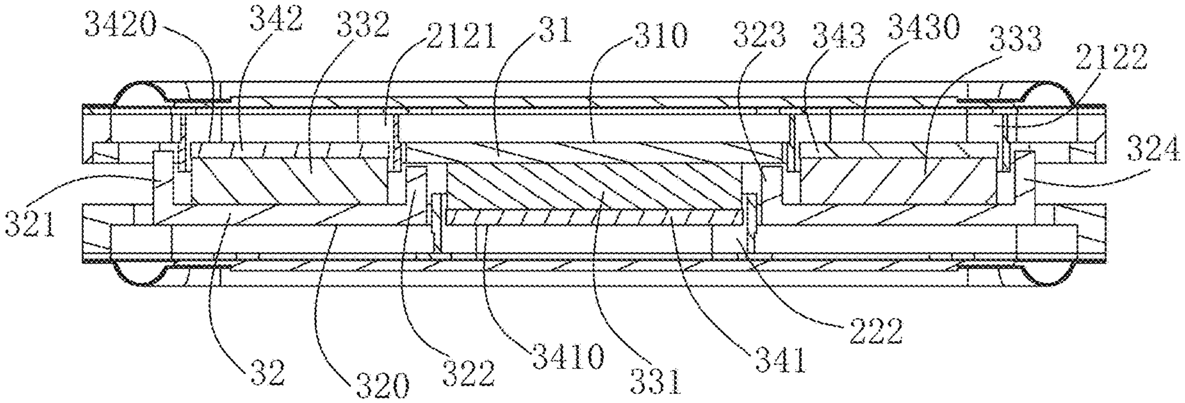
FIG. 3 is a cross-sectional view of the double-sided sounding device, taken along line A-A in FIG. 1.
Figure 4:
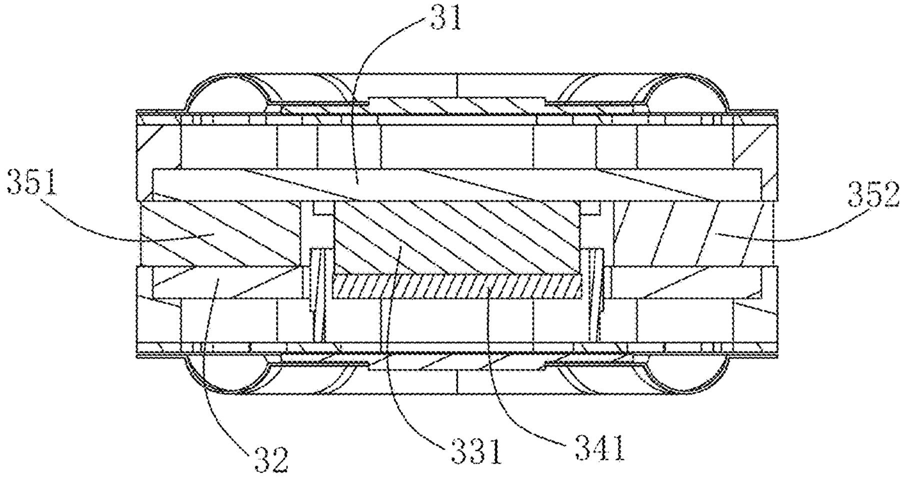
FIG. 4 is a cross-sectional view of the double-sided sounding device, taken along line B-B in FIG. 1.

Referring to FIGS. 1-4, the present disclosure discloses a double-sided sounding device 100 including an upper frame 11, a lower frame 12 arranged on a lower side of the upper frame 11, an upper vibration system 21 fixed to an upper side of the upper frame 11, a lower vibration system 22 fixed to a lower side of the lower frame 12, and a magnetic circuit system 3 arranged between the upper vibration system 21 and the lower vibration system 22.

The upper vibration system 21 includes an upper diaphragm 211 and an upper voice coil 212 driving the upper diaphragm 211 for vibrating and sounding, and the lower vibration system 22 includes a lower diaphragm 221 and a lower voice coil 222 driving the lower diaphragm 221 for vibrating and sounding. The upper voice coil 212 includes a first voice coil 2121 and a second voice coil 2122 respectively arranged on two opposite sides of the lower voice coil 222 along a direction of a long axis of the double-sided sounding device 100. In this embodiment, the upper diaphragm 211 and the lower diaphragm 221 have the same shape and size. The upper vibration system 21 further includes an upper flexible circuit board 213 sandwiched between the upper diaphragm 211 and the upper voice coil 212, and the lower vibration system 22 further includes a lower flexible circuit board 223 sandwiched between the lower diaphragm 221 and the lower voice coil 222.

The magnetic circuit system 3 includes an upper plate 31 fixed to the upper frame 11, a lower plate 32 fixed to the lower frame 12, a first main magnet 331 fixed to a surface of the upper plate 31 facing the lower plate 32, a first yoke 341 fixed to the first main magnet 331, a second main magnet 332 and a third main magnet 333 fixed to a surface of the lower plate 32 facing the upper plate 31 and respectively arranged on two opposite sides of the first main magnet 331 along the direction of the long axis of the double-sided sounding device 100, a second yoke 342 fixed to the second main magnet 332, a third yoke 343 fixed to the third main magnet 333, and a first side magnet 351 and a second side magnet 352 respectively arranged on two opposite sides of the first main magnet 331, the second main magnet 332 and the third main magnet 333 along a direction of a short axis of the double-sided sounding device 100 and sandwiched between the upper plate 31 and the lower plate 32. The upper voice coil 212 and the lower voice coil 222 are arranged between the first side magnet 351 and the second side magnet 352. The lower voice coil 222 surrounds the first main magnet 331 and the first yoke 341. The first voice coil 2121 surrounds the second main magnet 332 and the second yoke 342. The second voice coil 2122 surrounds the third main magnet 333 and the third yoke 343. Optionally, a surface 3410 of the first yoke 341 facing the lower diaphragm 221 is flush with a surface 320 of the lower plate 32 facing the lower diaphragm 221. A surface 3420 of the second yoke 342 facing the upper diaphragm 211 and a surface 3430 of the third yoke 343 facing the upper diaphragm 211 are flush with a surface 310 of the upper plate 31 facing the upper diaphragm 211.

The lower plate 32 includes a first side wall 321 and a second side wall 322 respectively arranged on two opposite sides of the second main magnet 332 along the direction of the long axis of the double-sided sounding device 100, and a third side wall 323 and a fourth side wall 324 respectively arranged on two opposite sides of the third main magnet 333 along the direction of the long axis of the double-sided sounding device 100. The second side wall 322 is arranged adjacent to the third side wall 323. The second side wall 322 is arranged between the lower voice coil 222 and the first voice coil 2121. The third side wall 323 is arranged between the lower voice coil 222 and the second voice coil 2122. Optionally, the second side wall 322 and the third side wall 323 abut against the surface of the upper plate 31 facing the lower plate 32.

In the double-sided sounding device 100 according to the present disclosure, the upper vibration system 21 includes the upper voice coil 212, and the lower vibration system 22 includes the lower voice coil 222, wherein the upper voice coil 212 includes a first voice coil 2121 and a second voice coil 2122 respectively arranged on two opposite sides of the lower voice coil 222 along the direction of the long axis of the double-sided sounding device 100. The upper voice coil 212 and the lower voice coil 222 are arranged side by side in the direction of the long axis of the double-sided sounding device 100, thereby reducing the product width and eliminating mutual interferences between the upper voice coil 212 and the lower voice coil 222 when working. In addition, the upper voice coil 212 and the lower voice coil 222 have symmetrical electromagnetic force performances by adjusting the length ratios of the first voice coil 2121, the lower voice coil 222 and the second voice coil 2122.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A double-sided sounding device, comprising:

an upper frame;

a lower frame arranged on a lower side of the upper frame;

an upper vibration system fixed to an upper side of the upper frame;

a lower vibration system fixed to a lower side of the lower frame; and a magnetic circuit system arranged between the upper vibration system and the lower vibration system;

wherein the upper vibration system comprises an upper diaphragm and an upper voice coil driving the upper diaphragm for vibrating and sounding, the lower vibration system comprises a lower diaphragm and a lower voice coil driving the lower diaphragm for vibrating and sounding, the upper voice coil comprises a first voice coil and a second voice coil respectively arranged on two opposite sides of the lower voice coil along a direction of a long axis of the double-sided sounding device.

2. The double-sided sounding device as described in claim 1, wherein the magnetic circuit system comprises an upper plate fixed to the upper frame, a lower plate fixed to the lower frame, a first main magnet fixed to a surface of the upper plate facing the lower plate, a first yoke fixed to the first main magnet, a second main magnet and a third main magnet fixed to a surface of the lower plate facing the upper plate and respectively arranged on two opposite sides of the first main magnet along the direction of the long axis of the double-sided sounding device, a second yoke fixed to the second main magnet, a third yoke fixed to the third main magnet, and a first side magnet and a second side magnet respectively arranged on two opposite sides of the first main magnet, the second main magnet and the third main magnet along a direction of a short axis of the double-sided sounding device and sandwiched between the upper plate and the lower plate, the upper voice coil and the lower voice coil are arranged between the first side magnet and the second side magnet, the lower voice coil surrounds the first main magnet and the first yoke, the first voice coil surrounds the second main magnet and the second yoke, the second voice coil surrounds the third main magnet and the third yoke.

3. The double-sided sounding device as described in claim 2, wherein the lower plate comprises a first side wall and a second side wall respectively arranged on two opposite sides of the second main magnet along the direction of the long axis of the double-sided sounding device, and a third side wall and a fourth side wall respectively arranged on two opposite sides of the third main magnet along the direction of the long axis of the double-sided sounding device, the second side wall is arranged adjacent to the third side wall, the second side wall is arranged between the lower voice coil and the first voice coil, the third side wall is arranged between the lower voice coil and the second voice coil.

4. The double-sided sounding device as described in claim 3, wherein the second side wall and the third side wall abut against the surface of the upper plate facing the lower plate.

5. The double-sided sounding device as described in claim 2, wherein a surface of the first yoke facing the lower diaphragm is flush with a surface of the lower plate facing the lower diaphragm.

6. The double-sided sounding device as described in claim 2, wherein surfaces of the second yoke and the third yoke facing the upper diaphragm are flush with a surface of the upper plate facing the upper diaphragm.

7. The double-sided sounding device as described in claim 1, wherein the upper vibration system further comprises an upper flexible circuit board sandwiched between the upper diaphragm and the upper voice coil, the lower vibration system further comprises a lower flexible circuit board sandwiched between the lower diaphragm and the lower voice coil.

8. The double-sided sounding device as described in claim 1, wherein the upper diaphragm and the lower diaphragm have the same shape and size.

* * * * *